United States Patent
Jiang et al.

(10) Patent No.: US 10,592,295 B2
(45) Date of Patent: Mar. 17, 2020

(54) INJECTION METHOD OF MONITORING AND CONTROLLING TASK EXECUTION IN A DISTRIBUTED COMPUTER SYSTEM

(71) Applicant: International Business Machines Corporation, Armonk, NY (US)

(72) Inventors: Peng Hui Jiang, Beijing (CN); Rongsong Shen, Beijing (CN); Hang Xiao, Beijing (CN); Jian Feng Zhang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 15/445,488

(22) Filed: Feb. 28, 2017

(65) Prior Publication Data

US 2018/0248780 A1    Aug. 30, 2018

(51) Int. Cl.
| | |
|---|---|
| *G06F 9/50* | (2006.01) |
| *G06F 11/30* | (2006.01) |
| *H04L 29/08* | (2006.01) |
| *H04L 12/24* | (2006.01) |

(52) U.S. Cl.
CPC ............ *G06F 9/5083* (2013.01); *G06F 11/30* (2013.01); *H04L 67/10* (2013.01); *H04L 41/046* (2013.01); *H04L 41/0806* (2013.01)

(58) Field of Classification Search
CPC ..... H04L 43/14; H04L 41/5003; H04L 67/10; G06F 9/5083
See application file for complete search history.

(56) References Cited

U.S. PATENT DOCUMENTS

| | | | |
|---|---|---|---|
| 5,933,639 A | 8/1999 | Meier et al. | |
| 7,392,290 B1* | 6/2008 | Duffield ............... | G06Q 10/107 709/206 |
| 8,572,575 B2 | 10/2013 | Berlyant et al. | |
| 8,589,885 B2 | 11/2013 | Maybee et al. | |
| 8,843,900 B2 | 9/2014 | Stall et al. | |
| 2008/0148266 A1* | 6/2008 | Caselli .................. | G06F 9/4881 718/102 |
| 2008/0215925 A1* | 9/2008 | Degenaro ............. | G06F 11/263 714/41 |

(Continued)

OTHER PUBLICATIONS

How to Debug Map/Reduce Programs, wiki.apache.org/hadoop/HowToDebugMapReducePrograms, as downloaded Dec. 30, 2016, pp. 1-2.

(Continued)

*Primary Examiner* — Arvin Eskandarnia
*Assistant Examiner* — Chhian (Amy) Ling
(74) *Attorney, Agent, or Firm* — Richard A. Wilhelm

(57) ABSTRACT

An injection system and method for monitoring and controlling task execution in a distributed computer system. The distributed computing environment is comprised of a plurality of computing nodes for executing an application, wherein the application is divided into tasks that are executed within containers on each of the nodes, and the tasks process vectors comprised of one or more data elements. A control plug-in injected into a specified container for execution with the tasks, wherein the control plug-in profiles footprint information for a targeted vector operated on by the tasks executed within the specified container.

19 Claims, 7 Drawing Sheets

(56) References Cited

U.S. PATENT DOCUMENTS

| | | | |
|---|---|---|---|
| 2009/0228870 A1* | 9/2009 | Kao | G06F 21/556 717/127 |
| 2010/0114811 A1* | 5/2010 | Lambov | G06N 5/02 706/48 |
| 2014/0164434 A1* | 6/2014 | Branson | G06F 17/30542 707/780 |
| 2015/0120637 A1 | 4/2015 | Eom et al. | |
| 2016/0026450 A1* | 1/2016 | Bodorlo | G06F 8/61 709/219 |
| 2017/0315795 A1* | 11/2017 | Keller | G06F 8/63 |
| 2017/0322824 A1* | 11/2017 | Reuther | G06F 3/0604 |

OTHER PUBLICATIONS

Big data, en.wikipedia.org/wiki/Big_data, as downloaded Dec. 30, 2016, pp. 1-10.

Apache Hadoop, en.wikipedia.org/wiki/Apache_Hadoop, as downloaded Dec. 30, 2016, pp. 1-9.

Murthy, A., "Apache Hadoop Yarn—Background and an Overview", hortonworks.com/blog/apache-hadoop-yarn-background-and-an-overview, Aug. 7, 2012, pp. 1-6.

Murthy, A., Apache Hadoop Yarn—Concepts and Applications, hortonworks.com/blog/apache-hadoop-yarn-concepts-and-applications, Aug. 15, 2012, pp. 1-8.

Gulzar, M.A., et al., "BigDebug: Debugging Primitives for Interactive Big Data Processing in Spark", 2016 IEEE/ACM 38th IEEE International Conference on Software Engineering, pp. 1-12.

Tan, J., et al., "Kahuna: Problem Diagnosis for MapReduce-Based Cloud Computing Environments", 2010 IEEE/IFIP Network Operations and Management Symposium—NOMS 2010: Mini-Conference, pp. 112-119.

Mell, P. et al., "The NIST Definition of Cloud Computing—Recommendations of the National Institute of Standards and Technology", National Institute of Standards and Technology, U.S. Department of Commerce, Special Publication 800-145, Sep. 2011, pp. 1-7.

* cited by examiner

INJECTION METHOD OF MONITORING AND CONTROLLING TASK EXECUTION IN A DISTRIBUTED COMPUTER SYSTEM

BACKGROUND

A job or application in a distributed computing environment is, by nature, difficult to monitor, control and troubleshoot. This is due to the increased complexity that the distributed computing environment introduces, as opposed to diagnosing issues on a single computer system.

Thus, there is a need in the art for improvements to monitoring, controlling and troubleshooting a job or application in a distributed computing environment. The present invention satisfies this need.

SUMMARY

The invention provided herein has a number of embodiments useful, for example, in monitoring and controlling task execution in a distributed computer system. According to various embodiments of the present invention, the distributed computing environment is comprised of a plurality of computing nodes for executing an application, wherein the application is divided into tasks that are executed within containers on each of the nodes, and the tasks process vectors comprised of one or more data elements. A control plug-in injected into a specified container for execution with the tasks, wherein the control plug-in profiles footprint information for a targeted vector operated on by the tasks executed within the specified container.

BRIEF DESCRIPTION OF THE DRAWINGS

Referring now to the drawings in which like reference numbers represent corresponding parts throughout.

DETAILED DESCRIPTION

Figure 1:
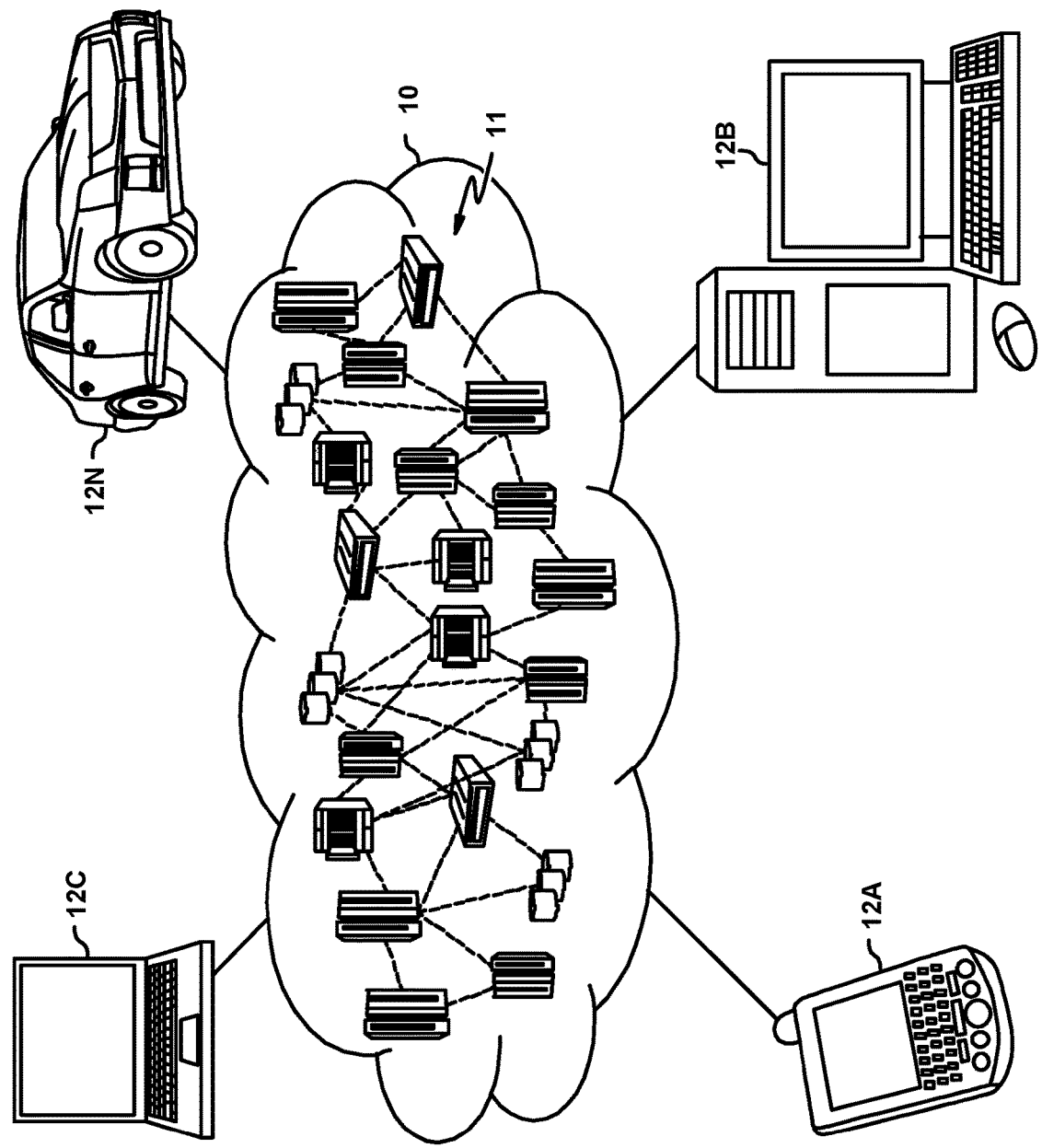
FIG. 1 depicts a cloud computing environment according to an embodiment of the present invention.

In the following description, reference is made to the accompanying drawings which form a part hereof, and in which is shown by way of illustration one or more specific embodiments in which the invention may be practiced. It is to be understood that other embodiments may be utilized and structural and functional changes may be made without departing from the scope of the present invention.

Overview

This disclosure describes a method of monitoring, controlling and troubleshooting an application in a distributed computing environment, especially an application comprised of multiple distributed tasks executed in multiple distributed containers on multiple nodes of a cluster in the distributed computing environment. The method provides each of the containers with a control plug-in that is used to profile targeted vectors by measuring code pieces in the tasks, identifying the code pieces operating on the targeted vectors, and collecting data on both the identified code pieces and the targeted vectors. For example, the control plug-in is configured to collect footprint information (e.g. memory properties) for the tasks, such as memory usage, call stack, invocation counter, consumption time, etc., for a monitor system. The monitor system is configured for profiling the footprint information, to monitor the progress of the tasks operating on the targeted vectors. The monitor system detects potential bottlenecks or system malfunctions using the footprint information and pre-defined rules. Once a threshold condition of a rule is triggered, then a corresponding action is performed by the monitor system, for example, sending instructions to the control plug-in to perform a desired function.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 10 is depicted. As shown, cloud computing environment 10 includes one or more cloud computing nodes 11 with which local computing devices used by cloud consumers, such as, for example, personal digital assistant (PDA) or cellular telephone 12A, desktop computer 12B, laptop computer 12C, and/or automobile computer system 12N may communicate. Nodes 11 may communicate with one another. They may be grouped (not shown) physically or virtually, in one or more networks, such as Private, Community, Public, or Hybrid clouds as described hereinabove, or a combination thereof. This allows cloud computing environment 10 to offer infrastructure, platforms and/or software as services for which a cloud consumer does not need to maintain resources on a local computing device. It is understood that the types of computing devices 12A-N shown in FIG. 1 are intended to be illustrative only and that computing nodes 11 and cloud computing environment 10 can communicate with any type of computerized device over any type of network and/or network addressable connection (e.g., using a web browser).

Figure 2:
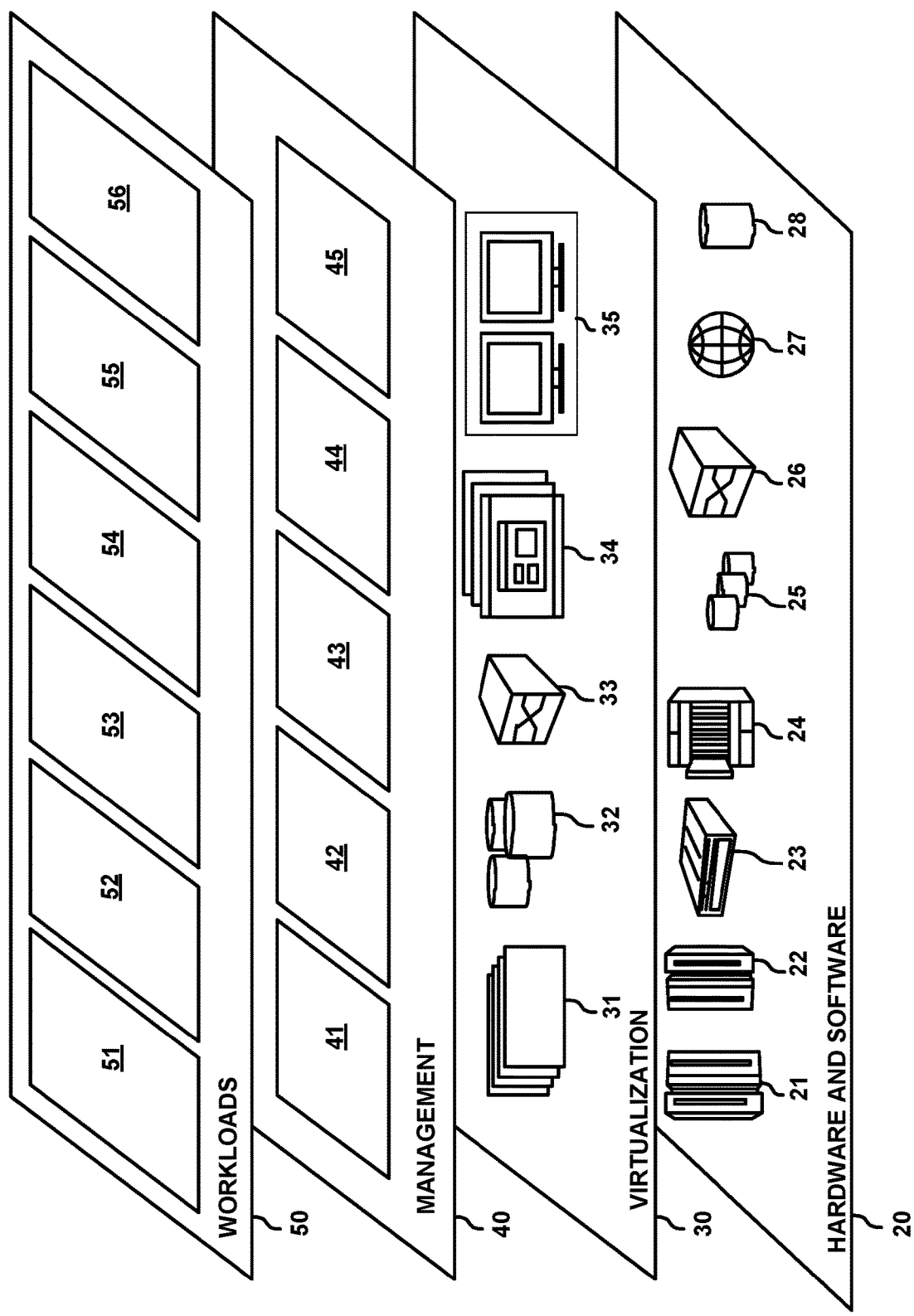
FIG. 2 depicts abstraction model layers according to an embodiment of the present invention.

Referring now to FIG. 2, a set of functional abstraction layers provided by cloud computing environment 10 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 20 includes hardware and software components. Examples of hardware components include: mainframes 21; RISC (Reduced Instruction Set Computer) architecture based servers 22; servers 23; blade servers 24; storage devices 25; and networks and networking components 26. In some embodiments, software components include network application server software 27 and database software 28.

Virtualization layer 30 provides an abstraction layer from which the following examples of virtual entities may be provided: virtual servers 31; virtual storage 32; virtual networks 33, including virtual private networks; virtual applications and operating systems 34; and virtual clients 35.

In one example, management layer 40 may provide the functions described below. Resource provisioning 41 provides dynamic procurement of computing resources and other resources that are utilized to perform tasks within the cloud computing environment 10. Metering and pricing 42 provide cost tracking as resources are utilized within the cloud computing environment 10, and billing or invoicing for consumption of these resources. In one example, these resources may include application software licenses. Security provides identity verification for cloud consumers and tasks, as well as protection for data and other resources. User portal 43 provides access to the cloud computing environment 10 for consumers and system administrators. Service level management 44, which includes containers, provides cloud computing resource allocation and management such that required service levels are met. Service Level Agreement (SLA) planning and fulfillment 45 provide pre-arrangement for, and procurement of, cloud computing resources for which a future requirement is anticipated in accordance with an SLA.

Workloads layer 50 provides examples of functionality for which the cloud computing environment 10 may be utilized. Examples of workloads, tasks and functions which may be provided from this layer include: data analytics processing 51; transaction processing 52; mapping and navigation 53; software development and lifecycle management 54; virtual classroom education delivery 55; etc.

Distributed Computing Environment

The cloud computing environment 10 of FIGS. 1 and 2 may be used to implement a distributed computing environment. One example of a distributed computing environment is Apache Hadoop™, which is an open-source software framework used for distributed storage and data analytics processing 51 of very large data sets among a cluster of nodes 11. This is referred to as "big data," which is a term for data sets that are so large or complex that traditional data processing applications are inadequate to deal with them.

Figure 3:
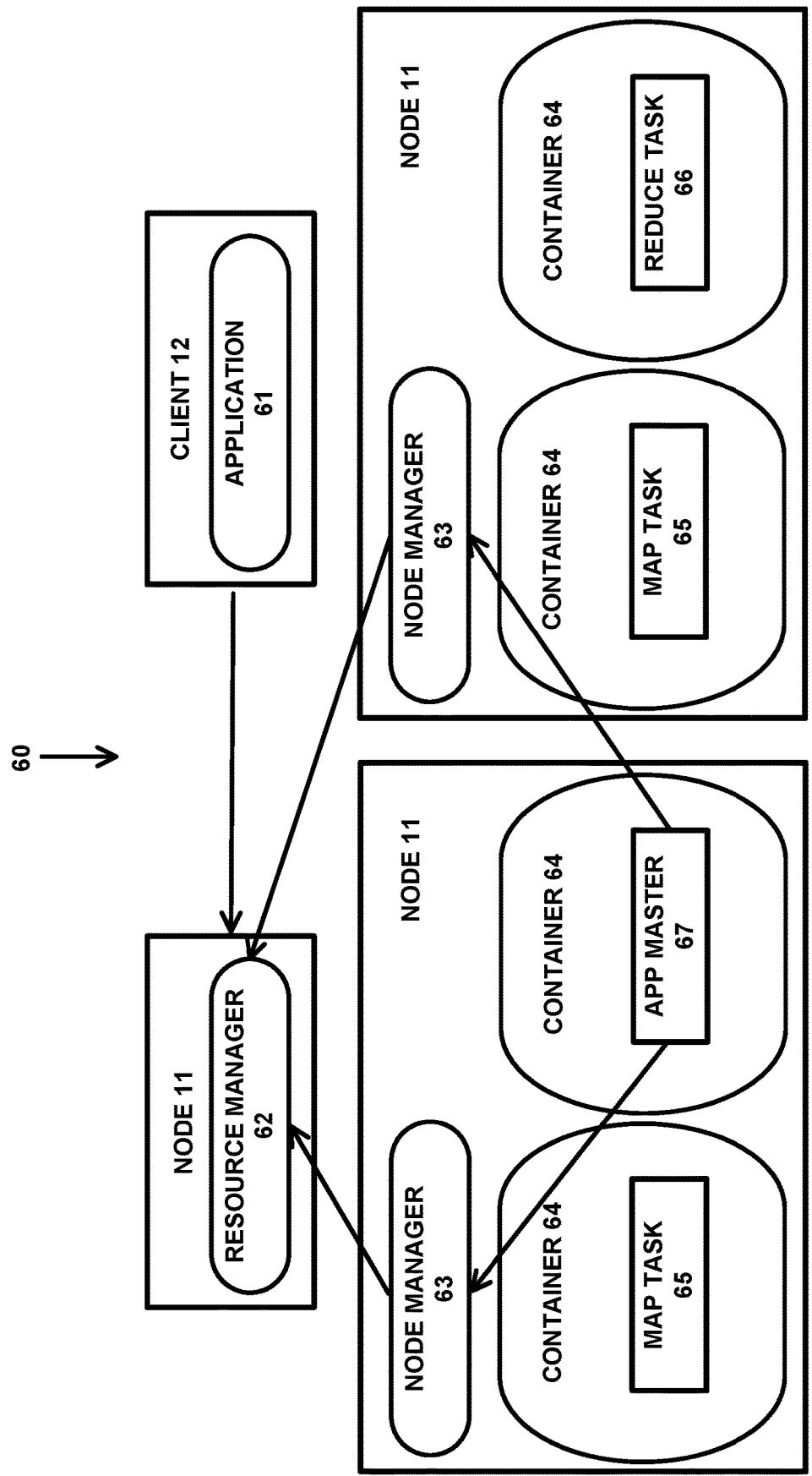
FIG. 3 illustrates a conventional architecture using a framework for a distributed computing environment, according to one embodiment.

FIG. 3 illustrates a conventional architecture using an Apache Hadoop™ framework for a distributed computing environment 60, according to one embodiment. The Hadoop™ framework is comprised of the following modules:

Hadoop™ Distributed File System (HDFS), which is database software 28 that stores data on the nodes 11, providing very high aggregate bandwidth across the cluster of nodes 11;

Hadoop™ Yarn, which is performs the resource provisioning 51 for managing computing resources among the nodes 11 and using them for scheduling of a user application 61, and is comprised of a resource manager 62, which is a scheduler that arbitrates all available resources; a per-node node manager 63, which takes direction from the resource manager 62 and is responsible for managing resources available on a single node 11; containers 64, which provide an execution environment for executing Map and Reduce tasks 65, 66; and an application (app) master 67, which is responsible for coordinating the execution of multiple Map and Reduce tasks 65, 66 for a single application 61; and Hadoop™ MapReduce, wherein an application 61 is divided into one or more Map tasks 65 that perform filtering and sorting, and/or one or more Reduce tasks 66 that perform summary operations.

Figure 4:
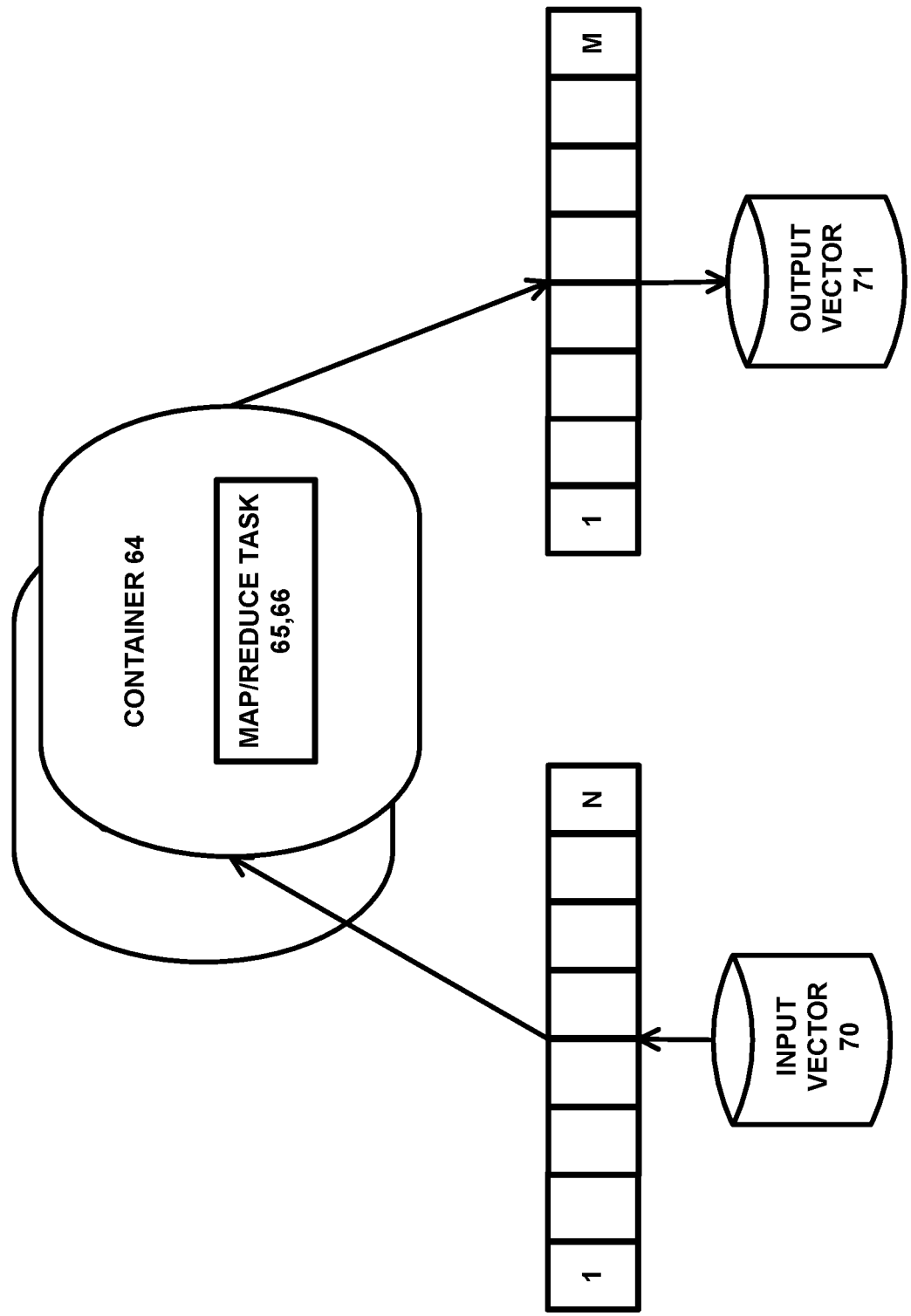
FIG. 4 further illustrates the functions performed by the tasks executed within the distributed computing environment.

FIG. 4 further illustrates the functions performed by the Map and Reduce tasks 65, 66, according to one embodiment. Typically, the Map and Reduce tasks 65, 66 accept an input vector 70 comprised of 1 to N data elements, perform some processing, and then store any intermediate or final results of the processing as an output vector 71 comprised of 1 to M data elements. This is a typical procedure for data analytics processing 51 of "big data."

For example, the following processing may be performed to append each non-zero data element of the input vector 71 to the output vector 71:

```
For iterator, value := range InputVector {
    if (value.xxx)
    {
        OutputVector.Append(xxxx)
    }
    ...
    continue;
}
```

The length of the input vector 70 and the value of iterator provide a measurement of the iterating progress, and the value of iterator also locates what data element in the input vector 70 is being appended to the output vector 71.

The Hadoop™ framework splits the data sets into subsets and distributes them across the nodes 11 in a cluster. It then transfers code pieces of the application 61 to the nodes 11 for execution as the Map and/or Reduce tasks 65, 66 to process the subsets in parallel. This approach takes advantage of data locality, with the nodes 11 manipulating the data they have access to, to allow the data to be processed faster and more efficiently than it would be in a more conventional computer architecture that relies on a parallel file system where computation and data are distributed via high-speed networking.

It is often necessary to monitor applications 61 running in a distributed computing environment 60. However, an application 61 and its tasks 65, 66 executed in a distributed computing environment 60, by their nature, are difficult to troubleshoot. This is due to the increasing complexity caused by the distributed computing environment 60.

For example, one task 65, 66 among many on multiple nodes 11 could hang-up for a period of time or fail, so the application 61 never completes. This can be caused by problematic code, problematic data, looping, recursion, or unexpected data that causes unexpected behavior.

Often, log files may need to be collected, so that they can be reviewed, in order to find possible causes of problems. However, it is possible that the log files do not have enough information for troubleshooting the problem. Thus, it may be required to change the logging level or change the programming of the application 61, and then redeploy and re-execute the tasks 65, 66 to collect more detailed information. Indeed, these steps may be performed any number of times.

These problems are hard to solve using existing prior art. Thus, there is a need in the art for improvements to distributed computing environment for monitoring, controlling and troubleshooting multiple tasks that are executed on multiple nodes.

Control Plug-In

Figure 5:
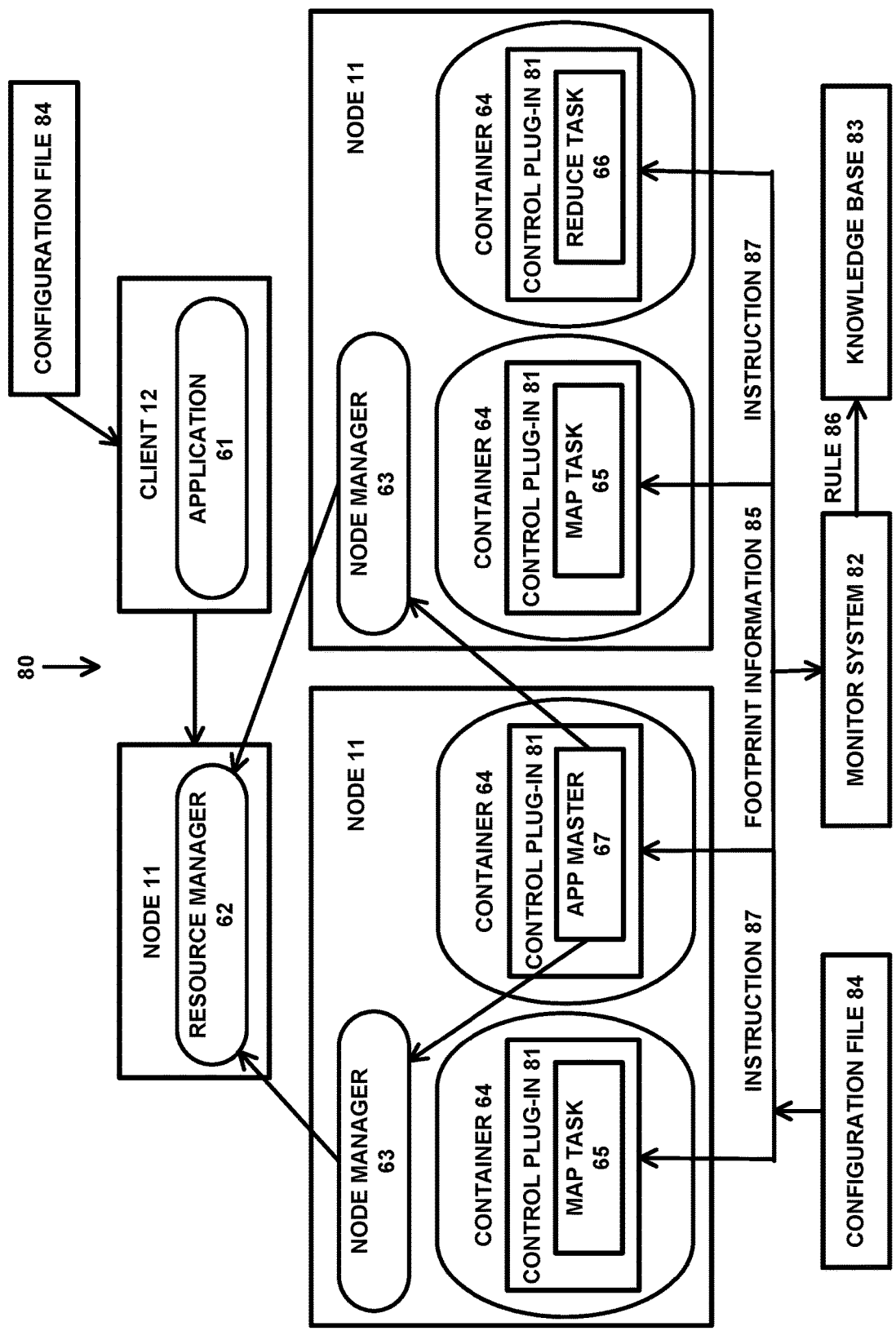
FIG. 5 illustrates an improved architecture for a distributed computing environment, according to one embodiment.

FIG. 5 illustrates an improved architecture for a distributed computing environment 80, according to one embodiment, which includes all of the components of the conventional architecture in FIG. 3 above, but also includes a control plug-in 81, monitor system 82, knowledge base 83, and configuration file 84.

This improved architecture provides a seamless plug-in method of monitoring and controlling task 65, 66 execution in the containers 64. Specifically, this improved architecture 10 collects footprint information 85 of tasks 65, 66 and containers 64 for diagnosing problems therein with regard to code pieces and vectors 70 being processed for the application 61. The footprint information 85 may include one or more of: memory, call stack, thread resources, vectors being operated on, iterating vector depth, vector length, vector invocation count, vector processing time, etc.

The control plug-in 81 is injected or otherwise introduced into a specified container 64 for execution with the tasks 65, 66, wherein the control plug-in 81 profiles the footprint information 85 for a targeted vector 70 operated on by the tasks 65, 66 within the specified container 64. Normally, a container 64 starts a child process to invoke a task 65, 66. In this embodiment, the specified container 64 first invokes a front-end virtual machine (VM) to execute the control plug-in 81, and then invokes a back-end virtual machine (VM) to execute the tasks 65, 66, wherein the control plug-in 81 interfaces between the specified container 64 and task 65, 66.

The control plug-in 81 takes advantage of the Java Platform Debugger Architecture (JPDA) in each container 64 to track and collect footprint information 85 of the container 64 and the tasks 65, 66. There is no need to change any of the programming of the application 61 or to debug the application 61 to implement the control plug-in 81. Thus, the execution and operation of the control plug-in 81 is transparent to the application 61.

The control plug-in 81 profiles a targeted vector 70 by identifying and measuring code pieces in the tasks 65, 66 operating on the targeted vector 70. The control plug-in 81 filters, sorts and/or aggregates the footprint information 85, and sends the footprint information 85, or metrics derived therefrom, in real-time to the monitor system 82. Moreover, the control plug-in 81 is configured as to what kind of footprint information 85 is sent to the monitor system 82, as described in more detail below in conjunction with the configuration files 84.

The monitor system 82 is configured for profiling the footprint information 85 to monitor the tasks' 65, 66 progress operating on the targeted vector 70. The monitor system 82 detects problems using the footprint information 85 and a pre-defined rule 86, such that when a threshold condition of the pre-defined rule 86 is triggered by the footprint information 85, then a corresponding action of the pre-defined rule 86 is performed by the monitor system 82, wherein the corresponding action may comprise sending an instruction 87 to the control plug-in 81 to record further information or adjust the execution of the tasks 65, 66 or containers 64. The pre-defined rule 86 is stored locally in the monitor system 82 or remotely in the knowledge base 83.

For example, if a task 65, 66 is taking too long to complete or has an abnormal end, the monitor system 82 can send instructions 87 to the control plug-in 81 to perform the following:

a. Re-execute this task 65, 66, for example, by assigning this task 65, 66 to several nodes 16 or a more powerful node 16, and having other tasks 65, 66 wait for the execution of this task 65, 66 to complete; or b. Re-balance all tasks 65, 66 of the application 61, so that this task 65, 66 can be assigned to several nodes 16 or a more powerful node 16.

In another example, the monitor system 82 uses the pre-defined rules 86 to detect a potential "log-behind" task 65, 66, i.e., a task 65, 66 that has hung or failed, and is no longer logging. The pre-defined rules 86 may include thresholds for response time, resource usage, and other related factors. The knowledge base 83 may record the previous execution history of a task 65, 66, so that action can be taken once similar execution of the task 65, 66 is detected.

In another example, the monitor system 82 performs vector profiling using the footprint information 85, or metrics derived therefrom, that relate to the targeted vector 70. The vector profiling performed by the monitor system 82 includes sorting, filtering and/or aggregating code pieces in the tasks 65, 66 according to the footprint information 85, or metrics derived therefrom. The vector profiling performed by the monitor system 82 may also include vector iterating depth profiling, wherein the vector iterating depth is a current iterating position or a recursive depth of a processing function within the tasks 65, 66 when operating on the targeted vector 70, and the vector iterating depth, in conjunction with a vector length, describes the tasks' 65, 66 progress when operating on the targeted vector 70.

In another example, the monitor system 82 identifies tasks 65, 66 and containers 64 with problems by sorting and filtering those tasks 65, 66 and containers 64 with the longest running times, with the longest invoking times, and with the longest iterating progress on the targeted vectors. In response to a threshold condition being triggered, the monitor system 82 may perform an action that sends an instruction to the control plug-in 81 to cause a dump of the tasks 65, 66 and/or container 64 runtime information. This allows an end user or developer to identify which code piece of the tasks 65, 66, or what data element of the targeted vector 70, is causing the problem.

The configuration file 84 is used to configure the application 61, the control plug-in 81, and the monitor system 81. Specifically, the configuration file 84 is used to perform one or more functions comprising:

1. Enabling the control plug-in 81.
2. Specifying which containers 64 execute the control plug-in 81 (optional).
3. Specifying a filter pattern for the targeted vector 70, e.g., which referencing packages, classes and/or methods, i.e., code pieces of the tasks 65, 66, are to have footprint information 85 collected when a vector 70 being operated on by the code piece matches a sequence of characters in the filter pattern. This is known as vector profiling, wherein the control plug-in 81 measures all the code pieces in the task 65, 66 that operate on the targeted vector 70. This greatly narrows the scope of the code pieces to be measured. Measuring all the code pieces in an application 61 or task 65, 66 would likely incur heavy overhead.
4. Specifying the footprint information 85 to collect.
5. Specifying one or more pre-defined rules 86, including threshold conditions to detect and actions to perform when the threshold condition is triggered, based on the collected footprint information 85 (optional).

In one embodiment, the configuration file 84 is an XML (eXtensible Markup Language) file. An example configuration file 84 is provided below:

```
<configuration>
<CallStackbyVectorProfiling>
<description>Vector for WATSON voice </description>
<VectorClassName>com.ibm.spss.ComputeMapper</VectorClassName>
<SampFreq> n sec, | n hours </SampFreq>
<Threshold opt="hangFor" action="dump "> 5 hrs</threshold>
<DumpLevel>Normal, WithDataSeg, WithFullMemory, WithThreadInfo, WithCodeSegs
</DumpLevel>
</CallStackbyVectorProfiling>
< VectorIterativedepthProfiling >
<description> Profiling on ICBC card vector length </description>
< VectorClassName>com.ibm.spss.ComputeMapper.CardSysteMap</VectorClassName>
<MeasureMethod>.size( ),.length( ), iteratorLenth( ), iteratorPosition( ) </value>
<threshold opt="gt|unchangedFor" action="dump|re-balance job">6 Sec, 1 hr
</threshold >
<threshold opt="gt|unchangedPercentFor" action="dump|re-balance job ">6 Sec, 1 hr
</threshold > ...dump_specification...
< /VectorIterativedepthProfiling >
< VectorSizeProfiling >
...
< /VectorSizeProfiling >
</configuration>
```

In the example configuration file 84, three profiling items are specified by start and end tags, namely, <Call StackbyVectorProfiling> and </CallStackbyVectorProfiling>, <VectorIterativedepthProfiling> and </VectorIterativedepthProfiling>, and </VectorSizeProfiling>. Each of the profiling items have different configuration attributes.

The first profile item "CallStackbyVectorProfiling" is used to monitor the changing frequency of a snapshot of the callstack of the class. The monitored class name is specified in the "VectorClassName" tag. If the callstack has not changed for 5 hours, which is defined in the "Threshold" tag, then a dump action will be taken. There are multiple dump levels selected from "Normal", "WithDataSeg", "WithCodeSegs", "WithThreadInfo", to "WithFullMemory," which are specified in the "DumpLevel" tag.

The second profile item "VectorIterativedepthProfiling" is used to monitor the traversing of data structures, such as queue, stack, map, and so on. The monitored class name is specified in the "VectorClassName" tag. The length of data structure, and current position can be selected as measurement metrics. By monitoring these data structures, pro-active action can be taken if an abnormal situation occurs. For example, if the current position of iteration has not changed for more than 1 hour, then a dump action can be taken. In the same manner as the first example, different dump levels can be selected.

The third profile item "VectorSizeProfiling" is used to monitor the size of vectors. This is merely a placeholder, as no parameters are specified in this profiling item.

In summary, this disclosure includes a number of advantages. It provides a valuable way to troubleshoot tasks 65, 66 in distributed containers 64, such as hung or long-running tasks 65, 66. Moreover, data sensitive code problems, such as hangs or crashes on specific data, can be identified and corrected. In addition, effective pro-active actions may be taken to help the application to succeed.

Deployment

While it is understood that the process software described herein, including the Hadoop™ framework, as well as the control plug-in 81, monitor system 82, knowledge base 83, and configuration files 84, may be deployed by manually loading the process software directly in the various nodes 11 via loading a storage medium, such as a CD, DVD, etc., the process software may also be automatically or semi-automatically deployed by sending the process software to one or more of the nodes 11, or by downloading the process software into the nodes 11. The process software is then either detached to a directory or loaded into a directory by executing a set of program instructions that detaches the process software into a directory. Another alternative is to send the process software directly to a directory on the nodes' 11 hard drives. Once present on the nodes 11, the process software will be installed on the nodes 11.

Figure 6:
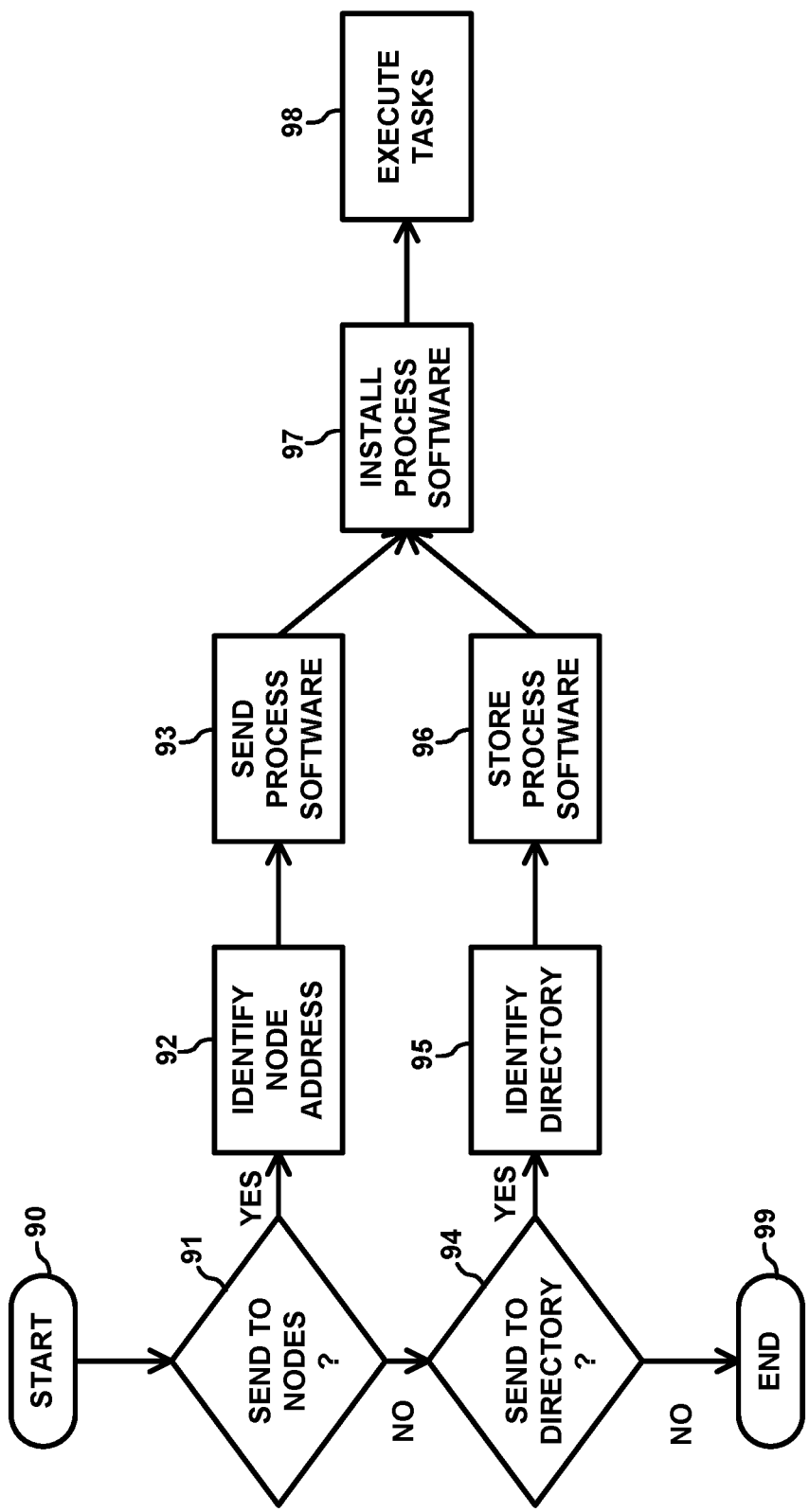
FIG. 6 is a flowchart illustrating the deployment of the process software, according to one embodiment.

FIG. 6 is a flowchart illustrating the deployment of the process software, according to one embodiment. The logic starts at 90. A determination is made on whether the process software is to be deployed by sending it to the nodes 11 (91). If so, the addresses of the nodes 11 are identified (92) and the process software is sent to the nodes (93). Otherwise, a determination is made on whether the process software will be sent directly to directories on the nodes 11 (94). If so, the directories are identified (95), and the process software is stored into the directory (96). Thereafter, for both cases, the process software is installed on the nodes 11 (97), and the tasks 65, 66 are executed (98). Otherwise, the logic ends at 99.

Processing

Figure 7:
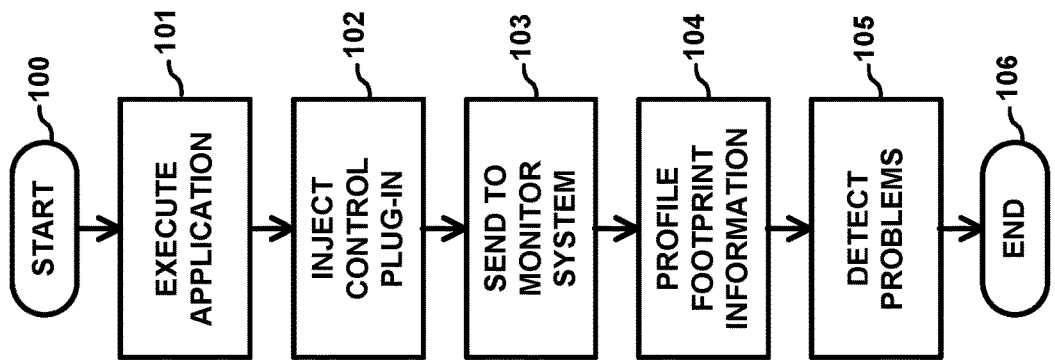
FIG. 7 is a flowchart illustrating the data analytics processing that is performed after the process software has been deployed, according to one embodiment.

FIG. 7 is a flowchart illustrating the data analytics processing 51 that is performed after the process software has been deployed, according to one embodiment. The logic starts at 100.

Block 101 represents the step of executing an application 61 in a distributed computing environment 80 comprised of a plurality of computing nodes 11, wherein the application 61 is divided into tasks 65, 66 that are executed within containers 64 on each of the nodes 11, and the tasks 65, 66 process vectors 70 comprised of one or more data elements.

Block 102 represents the step of injecting a control plug-in 81 into a specified container 64 for execution with the tasks 65, 66, wherein the execution and operation of the control plug-in 81 is transparent to the application 61 and the control plug-in 81 profiles footprint information 85 for a targeted vector 70 operated on by the tasks 65, 66 executed within the specified container 64. In one embodiment, the footprint information 85 includes one or more of: memory, call stack, thread resources, vectors being operated on, iterating vector depth, vector length, vector invocation count, and vector processing time.

Block 103 represents the step of the control plug-in 81 filtering, sorting and/or aggregating the footprint information 85, and then sending the footprint information 85, or metrics derived therefrom, to a monitor system 82, wherein the control plug-in 81 is configured as to what kind of footprint information 85 is sent to the monitor system 82.

Block 104 represents the step of the monitor system 82 profiling the footprint information 85 to monitor the tasks' 65, 66 progress operating on the targeted vector 70. In one embodiment, the monitor system 82 performs vector profiling using the footprint information 85, or metrics derived therefrom, that relate to the targeted vector 70. The vector profiling performed by the monitor system 82 includes vector iterating depth profiling, wherein the vector iterating depth is a current iterating position or a recursive depth of a processing function within the tasks 65, 66 when operating on the targeted vector 70, and the vector iterating depth, in conjunction with a vector length, describes the tasks' progress when operating on the targeted vector 70. The vector profiling performed by the monitor system 82 also identifies tasks 65, 66 and containers 64 with problems by sorting and filtering the tasks 65, 66 and containers 64 with longest running times, with longest invoking times, or with longest iterating progress on the targeted vector 70.

Block 105 represents the step of the monitor system 82 detecting problems using the footprint information 85 and a pre-defined rule 86 stored locally in the monitor system 82 or remotely in a knowledge base 83, such that when a threshold condition of the pre-defined rule 86 is triggered by the footprint information 85, then a corresponding action of the pre-defined rule 86 is performed by the monitor system 82, wherein the corresponding action comprises sending an instruction to the control plug-in 81 to record further information or adjust the execution of the tasks 65, 66 or containers 64.

Thereafter, the logic ends at 106.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

CONCLUSION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system, comprising:
 a distributed computing environment comprised of a plurality of computing nodes for executing an application, wherein the application is divided into a plurality of tasks that are executed within one or more containers on each of the computing nodes, and each of the tasks process sectors comprised of one or more data elements;

a control plug-in injected into the containers for execution with the tasks that are executed within the containers, wherein the execution and operation of the control plug-in within the containers is transparent to the tasks executed within the containers and the control plug-in profiles footprint information for one or more vectors processed by the tasks executed within the containers; and a monitor system for collecting the footprint information from the control plug-in executed within the containers to monitor the tasks' processing of the vectors, wherein the monitor system detects problems using the footprint information and then sends instructions to the control plug-in to adjust the execution of the tasks or containers, wherein the footprint information includes one or more of: vectors being operated on, iterating vector depth, vector length, vector invocation count, and vector processing time.

2. The system of claim 1, wherein the footprint information includes one or more of:

memory, call stack, and thread resource.

3. The system of claim 1, wherein the control plug-in filters, sorts and/or aggregates the footprint information, and sends the footprint information, or metrics derived therefrom, to the monitor system.

4. The system of claim 3, wherein the control plug-in is configured as to what kind of footprint information is sent to the monitor system.

5. The system of claim 3, wherein the monitor system is configured for profiling the footprint information to monitor the tasks' progress operating on the targeted vector.

6. The system of claim 3, wherein the monitor system detects problems using the footprint information and a pre-defined rule, such that when a threshold condition of the pre-defined rule is triggered by the footprint information, then a corresponding action of the pre-defined rule is performed by the monitor system.

7. The system of claim 6, wherein the pre-defined rule is stored locally in the monitor system or remotely in a knowledge base.

8. The system of claim 6, wherein the corresponding action comprises sending an instruction to the control plug-in to record further information.

9. The system of claim 1, wherein the monitor system performs vector profiling using the footprint information, or metrics derived therefrom, that relate to the targeted vector.

10. The system of claim 9, wherein the vector profiling performed by the monitor system includes vector iterating depth profiling, wherein the vector iterating depth is a current iterating position or a recursive depth of a processing function within the tasks when operating on the targeted vector, and the vector iterating depth, in conjunction with a vector length, describes the tasks' progress when operating on the targeted vector.

11. The system of claim 9, wherein the vector profiling performed by the monitor system identifies tasks and containers with problems by sorting and filtering the tasks and containers with longest running times, with longest invoking times, or with longest iterating progress on the targeted vector.

12. The system of claim 1, wherein a configuration file is used to perform one or more functions comprising:

enabling the control plug-in;
specifying which container executes the control plug-in;
specifying a filter pattern for the targeted vector;
specifying the footprint information to collect; and
specifying one or more pre-defined rules.

13. A method, comprising:

executing an application in a distributed computing environment comprised of a plurality of computing nodes, wherein the application is divided into a plurality of tasks that are executed within one or more containers on each of the computing nodes, and each of the tasks process vectors comprised of one or more data elements;

injecting a control plug-in into the containers for execution with the tasks that are executed within the containers, wherein the execution and operation of the control plug-in within the containers is transparent to the tasks executed within the containers and the control plug-in profiles footprint information for one or more vectors processed by the tasks executed within the containers; and executing a monitor system for collecting the footprint information from the control plug-in executed within the containers to monitor the tasks' processing of the vectors, wherein the monitor system detects problems using the footprint information and then sends instructions to the control plug-in to adjust the execution of the tasks or containers, wherein the footprint information includes one or more of: sectors being operated on, iterating vector depth, vector length, vector invocation count, and vector processing time.

14. The method of claim 13, wherein the footprint information includes one or more of:

memory, call stack, and thread resources.

15. The method of claim 13, wherein the control plug-in filters, sorts and/or aggregates the footprint information, and sends the footprint information, or metrics derived therefrom, to the monitor system, and the monitor system is configured for profiling the footprint information to monitor the tasks' progress operating on the targeted vector.

16. The method of claim 15, wherein the monitor system detects problems using the footprint information and a pre-defined rule, such that when a threshold condition of the pre-defined rule is triggered by the footprint information, then a corresponding action of the pre-defined rule is performed by the monitor system, wherein the corresponding action comprises sending an instruction to the control plug-in to record further information.

17. The method of claim 15, wherein the monitor system performs vector profiling using the footprint information, or metrics derived therefrom, that relate to the targeted vector, and the vector profiling performed by the monitor system includes vector iterating depth profiling, wherein the vector iterating depth is a current iterating position or a recursive depth of a processing function within the tasks when operating on the targeted vector, and the vector iterating depth, in conjunction with a vector length, describes the tasks' progress when operating on the targeted vector.

18. The method of claim 15, wherein the monitor system performs vector profiling using the footprint information, or metrics derived therefrom, that relate to the targeted vector, and the vector profiling performed by the monitor system identifies tasks and containers with problems by sorting and filtering the tasks and containers with longest running times, with longest invoking times, or with longest iterating progress on the targeted vector.

19. A computer program product, the computer program product comprising a computer readable storage medium having program instructions embodied therewith, the program instructions executable by a processor to cause the processor to:
- execute an application in a distributed computing environment comprised of a plurality of computing nodes, wherein the application is divided into a plurality of tasks that are executed within one or more containers on each of the computing nodes, and each of the tasks process vectors comprised of one or more data elements;
- inject a control plug-in into the containers for execution with the tasks that are executed within the containers, wherein the execution and operation of the control plug-in within the containers is transparent to the tasks executed within the containers and the control plug-in profiles footprint information for one or more vectors operated on by the tasks executed within the containers; and
- execute a monitor system for collecting the footprint information from the control plug-in executed within the containers to monitor the tasks' processing of the vectors, wherein the monitor system detects problems using the footprint information and then sends instructions to the control plug-in to adjust the execution of the tasks or containers,
- wherein the footprint information includes one or more of: vectors being operated on, iterating vector depth, vector length, vector invocation count, and vector processing time.

* * * * *